T. E. Baden,
Mechanical Brake.
No. 105,765.   Patented July 26, 1870.
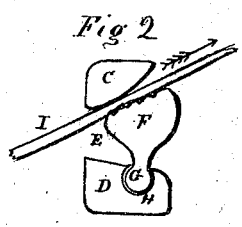
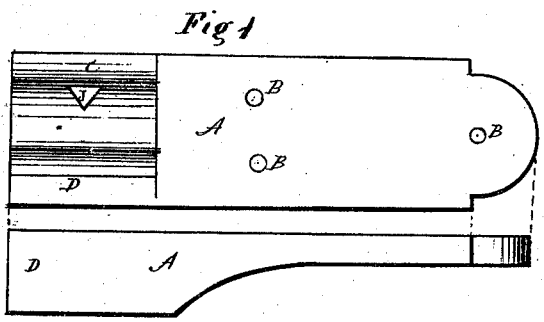
Witnesses.
J. Dennis Jr
Jos. T. R. Plant
Inventor:
Thomas Edwin Baden

United States Patent Office.

THOMAS EDWIN BADEN, OF WASHINGTON, DISTRICT OF COLUMBIA.

Letters Patent No. 105,765, dated July 26, 1870.

IMPROVEMENT IN TRAVELING BELT-STOP FOR MACHINERY.

The Schedule referred to in these Letters Patent and making part of the same.

*To all whom it may concern:*

Be it known that I, THOMAS EDWIN BADEN, of Washington, Washington county, District of Columbia, have invented a new and useful Traveling or Rotating Belt or Band-Stop for Machinery; and I hereby declare the following to be a full and exact description thereof, reference being had to the accompanying drawing forming part of this specification.

The nature or essence of my invention consists in a slotted stand, provided with a pawl or cam arranged to stop and hold a traveling or rotating band, if it is moved backward or in the wrong direction, and allow it to move forward again freely in the right direction. Also, in making a notch in the pawl or cam to adapt it to round bands.

In the accompanying drawing—

Figure 1 shows the upper side and edge of a stand with pawl or cam;

Figure 2 is an end view of the same; and

Figure 3, the underside of the pawl or cam.

In the drawing—

A is a stand, which I prefer to make of metal, in the form shown, with three screw-holes, B B, for screws to fasten it to the underside of a table or sewing-machine, or other article, where it is wanted to be used.

At one end of this stand I make two arms, C and D, in the form shown in fig. 2, with a slot or space, E, between them for the pawl or cam F, which is made in the form shown, with a bead, G, at one edge, fitted to work freely in the cavity H in the arm D, to allow the pawl to vibrate freely, and fall or lay against the traveling or rotating belt I, to allow the belt to pass up or in the direction of the arrow freely, while a very slight motion in a contrary direction of the belt will bring the pawl F down, and press the belt against the arm C and stop it instantly, and prevent it from being moved further in the wrong direction, but a very slight movement of the band in the direction of the arrow, releases the gripe of the pawl, and permits the belt to run freely in the right direction.

I make a notch or score, J, in the pawl F, as shown in figs. 1 and 3, to adapt the pawl to round as well as flat bands.

My improved belt-stopper may be applied to any machinery or millwright work, where it is desirable to prevent a belt from moving backward, or in the wrong direction.

Having described my invention,

I will state my claim as follows:

The belt-stop described, consisting of the stand A, having an arm, C, and grooved arm D, with a detachable serrated pawl, F, having a bead, G, and provided with a notch, J, when required, combined, and operating substantially as and for the purpose set forth.

THOMAS EDWIN BADEN.

Witnesses:
   J. DENNIS, Jr.,
   JOS. T. K. PLANT.